Patented Aug. 10, 1943

2,326,623

UNITED STATES PATENT OFFICE 2,326,623

COATING COMPOSITION

Edwin W. Crosby, Swarthmore, Pa., assignor to E. I. du Pont de Nemours & Company, Wilmington, Del., a corporation of Delaware No Drawing. Application September 30, 1941, Serial No. 412,955

4 Claims. (Cl. 260—3)

This invention relates to novelty finishes of the hammered metal, stipple, spatter and similar type and more particularly to such type novelty finishes which may be made by the use of a single composition in one application of such a composition.

Various procedures and compositions have been proposed for producing such novelty finishes but none have been entirely acceptable for various reasons. Among these procedures are such as require a base coat on the article to be decorated over which is applied a special type of composition which produces strings or blotches which are embedded in but do not entirely cover the base coat and thus form the special type finish; such as produce a multi-toned effect by spattering upon the surface to be protected and decorated droplets of a composition having a definite viscosity, the droplets spreading on the surface over small areas and such in which the composition which is applied in spatter form to the surface to be decorated and protected contains a volatile solvent of definite composition and volatility.

None of the proposed procedures have been generally adopted in the finishing industry due to certain inherent deficiencies. One of these is that the production of many novelty effects is tedious. Particular patterns are in many cases not satisfactorily reproducible. Further the two coat systems as well as the necessarily closely controlled compositions are not attractive, for general use, from an economic standpoint. A satisfactory composition which could be applied in a single coating to produce the novelty finishes is highly desired and would be readily accepted by the finishing industry.

This invention presents as the principal object the provision of compositions and means for producing so-called novelty finishes of the hammered-effect, spatter, etc. type.

A further object is to provide coating compositions which will produce such novelty finishes.

A still further object is to provide compositions which will produce such novelty finishes in a single coating.

Another object is the provision of compositions and means for producing the novelty finishes, which are simple and economical so as to lend themselves to broad general application.

Other objects will be readily apparent as the description of the invention proceeds.

These and other objects are accomplished in the present invention by providing compositions which may be applied in a single application, such compositions comprising in combination with a resinous or oleoresinous vehicle, a coloring material, a flake metal pigment and a small percentage of raw rubber.

The invention will be more fully understood by the following examples which are by way of illustration but not limitation except insofar as defined in the appended claims. The parts are by weight.

EXAMPLE I

Orchid hammered effect enamel

|  | Parts |
|---|---|
| Ultramarine blue pigment | 4.1 |
| Lithol red pigment | .4 |
| Bone black pigment | .1 |
| Aluminum flake pigment paste | 2.9 |
| Alkyd resin A (solids) | 3.0 |
| Alkyd resin B (solids) | 30.3 |
| Urea-formaldehyde-monohydric alcohol resin (solids) | .9 |
| Driers | .2 |
| Hydrocarbon solvents | 57.1 |
| Raw rubber | 1.0 |
|  | 100.0 |

The aluminum flake pigment paste is a commonly available paste containing approximately 65% metal flake in a liquid petroleum hydrocarbon.

Alkyd resin A is a 52% linseed oil modified glyceryl phthalate resin.

Alkyd resin B is an approximately 35%/14.0% linseed oil/China-wood oil modified glyceryl phthalate resin.

The urea-formaldehyde-monohydric alcohol resin is one prepared according to U. S. Patent 2,191,957.

The drier used was cobalt napthenate. This is preferably introduced as a solution in a suitable hydrocarbon solvent. Lead or manganese naphthenates may also be used either alone or in combination with the cobalt naphthenate.

The hydrocarbon solvents used were high solvency petroleum hydrocarbons. Mixtures of high solvency aliphatic petroleum hydrocarbons and aromatic hydrocarbons may also be used.

The rubber is preferably introduced into the composition as an approximately 50% solution in an aromatic hydrocarbon solvent as toluene.

The composition may be conveniently prepared by dispersing the pigments, other than the aluminum flake, in a portion of the resins in solution in a ball mill or other convenient dispersing means, adding the aluminum flake pigment to this dispersion together with the remainder of the resins and thoroughly mixing; then adding the driers and then the rubber together with the remainder of the solvent and thoroughly mixing.

The finished enamel when applied by standard spraying procedures to a bare metal surface or other suitable base and baked for one hour at 250–275° F. produces a smooth, high gloss hammered-effect finish in a single coating.

EXAMPLE II

*Blue hammered-effect enamel*

| | Parts |
|---|---|
| Ultramarine blue pigment | 9.4 |
| Lithol red pigment | .1 |
| Bone black pigment | .3 |
| Aluminum flake pigment paste | 1.1 |
| Alkyd resin A | 5.2 |
| Alkyd resin B | 27.5 |
| Urea - formaldehyde - monohydric alcohol resin | 1.2 |
| Driers | .2 |
| Raw rubber | 1.0 |
| Hydrocarbon solvents | 54.0 |
| | 100.0 |

The resins, drier and rubber used in this example were as previously described. The composition may be prepared according to the procedure noted under Example 1 or by any other suitable method known to those skilled in the art of preparing enamel compositions.

The finished enamel when applied to a suitable surface produced a hammered effect finish as described under Example I. The pattern of the finish may be varied by simple expedients as noted hereinafter.

EXAMPLE III

*Gray hammered-effect enamel*

| | Parts |
|---|---|
| Lamp black pigment | 1.7 |
| Aluminum flake pigment paste | 1.5 |
| Alkyd resin A | 3.4 |
| Alkyd resin B | 32.3 |
| Driers | 1.1 |
| Urea resin | .4 |
| Raw rubber | 1.5 |
| Hydrocarbon solvents | 58.1 |
| | 100.0 |

This composition may be prepared as previously described and when applied to a suitable surface produces the hammered-effect finishes as previously described.

As shown in the examples, the novelty finishes are developed by applying the compositions through a spray gun as used for regular enamels, such guns being either of the pressure or suction type. If larger patterned hammered-effect finishes are desired, pressure feed so-called "stipple" or "spatter" guns may be used. In using a regular type spray gun for enamel, the gun may be placed from approximately 6 to 8 inches from the surface to be decorated and an air pressure of approximately 65–75 pounds per square inch used. In using pressure feed, fluid pressures of from approximately 7 to 12 pounds and air pressures of from 65 to 75 pounds yield satisfactory results. While it is apparent that the application of the compositions involves no special or tedious techniques, simple variations as indicated and commonly used in the spraying applications art are well within the purview of the present invention and may be used in producing variations in pattern. The novelty finishes are produced with the present compositions in a single coating, the thickness of which may be varied to suit particular conditions or requirements. If desired, however, the compositions may be applied to a surface to which has been previously applied and dried a so-called priming coating. Such primer or base coatings, however, form no part of the novelty finish or are they involved in the production of such finishes or the pattern thereof. The present compositions are for producing novelty finishes primarily in one application or coating.

While aluminum flake pigment is used in the compositions of the examples, other metallic pigments as the so-called bronze powders, etc. may be used, the percentage varying with the particular color enamel being made and the pattern desired in the finish. The amount to be used may be readily and easily determined and will be apparent to those skilled in the art. Any particular color or shade of enamel may be made by the use of the requisite pigment or combination of pigments.

In addition to the fatty oil or fatty oil acid modified alkyd resins shown in the examples other film-forming vehicles as other synthetic resins, solely or in admixture, oleoresinous compositions, cellulose derivatives with various plasticizers, etc. may be used. The enamels produced according to the present invention may be of the baking or air drying type as desired.

The raw rubber is conveniently incorporated into the compositions in the form of a dispersion or solution in a liquid hydrocarbon solvent as previously noted. The preferred amount for use in the compositions has been found to range between 0.8 and 2.0% based on the total composition. Amounts of less than 0.8% have been found not to produce a distinctive pattern and the use of amounts greater than 2.0% show no increase in the pattern effect produced but cause a rough surface which is undesirable.

With respect to metal flake, I have found that from 0.5% to 4.0% of aluminum or other metallic flake based on the total composition produces the best results, accordingly, the dry film would contain from about 0.9% to 7.0% of metallic aluminum although between 2.0% and 3.0% represents the preferred range.

The present compositions are adaptable to decorating and protecting various types of surfaces particularly metal surfaces on which it is desired to impart novelty finishes such as described. Particular objects to which the finish is adaptable are radio cabinets, radio chassis, toys, metal cabinets, business machines of various types, electrical heating equipment, etc.

It will be apparent from the foregoing that a practical advance has been made in the art of producing novelty finishes in that there has been provided compositions and means for producing novelty finishes in a single coating. Further, production of such compositions and finishes therefrom is simple and economical and thus lends itself to broad general application.

It is apparent that many widely different embodiments of this invention may be made without departing from the spirit and scope thereof, and therefore, it is not intended to be limited except as indicated in the appended claims.

I claim:
1. A coating composition adapted to be applied by spraying comprising a resinous film-forming agent, flake aluminum, and from 0.8 to 2.0% of rubber.
2. A coating composition adapted to be applied in one application by spraying and which yields a metallic hammered appearance comprising a resinous film-forming ingredient, a pigment, from 0.5 to 4.0% of metallic flake, and from 0.8 to 2.0% of raw rubber.
3. A coating composition adapted to be applied in one application by spraying which yields a hammered metallic appearance comprising a pigment, from 0.5 to 4.0% of aluminum flake, an oil modified alkyd resin, and from 0.8 to 2.0% of raw rubber.
4. A coating composition adapted to be applied by spraying having approximately the following composition:

| | Parts |
|---|---|
| Ultramarine blue pigment | 4.1 |
| Lithol red pigment | .4 |
| Bone black pigment | .1 |
| Aluminum flake pigment paste | 2.9 |
| Alkyd resin A (solids) | 3.0 |
| Alkyd resin B (solids) | 30.3 |
| Urea - formaldehyde - monohydric alcohol resin (solids) | .9 |
| Driers | .2 |
| Hydrocarbon solvents | 57.1 |
| Raw rubber | 1.0 |
| | 100.0 |

EDWIN W. CROSBY.